(12) United States Patent
McKinney

(10) Patent No.: US 7,149,701 B2
(45) Date of Patent: Dec. 12, 2006

(54) REGULATORY COMPLIANCE SYSTEM AND METHOD

(75) Inventor: Jerry L. McKinney, Lumberton, TX (US)

(73) Assignee: Jerry L. McKinney 2002 Trust, Silsbee, TX (US)

(*) Notice: Subject to any disclaimer, the term of this patent is extended or adjusted under 35 U.S.C. 154(b) by 208 days.

(21) Appl. No.: 10/003,633

(22) Filed: Nov. 2, 2001

(65) Prior Publication Data
US 2004/0019511 A1 Jan. 29, 2004

(51) Int. Cl.
G05B 19/418 (2006.01)
G05F 9/46 (2006.01)

(52) U.S. Cl. .......................................... 705/8
(58) Field of Classification Search ............... 705/1, 705/8, 28; 702/182, 183, 184, 185, 187, 702/188; 348/91, 143
See application file for complete search history.

(56) References Cited

U.S. PATENT DOCUMENTS

| | | | | |
|---|---|---|---|---|
| 4,401,994 A | * | 8/1983 | Witts et al. | 235/377 |
| 4,949,263 A | * | 8/1990 | Jurca | 701/50 |
| 5,321,396 A | * | 6/1994 | Lamming et al. | 340/825.49 |
| 5,666,294 A | * | 9/1997 | Takada et al. | 702/182 |
| 5,673,190 A | * | 9/1997 | Kahleck et al. | 700/2 |
| 5,844,601 A | * | 12/1998 | McPheely et al. | 348/143 |
| 5,926,209 A | * | 7/1999 | Glatt | 348/143 |
| 5,950,150 A | * | 9/1999 | Lloyd et al. | 702/183 |
| 6,317,039 B1 | * | 11/2001 | Thomason | 340/505 |
| 6,505,774 B1 | * | 1/2003 | Fulcher et al. | 235/381 |
| 2002/0077777 A1 | * | 6/2002 | Wolfe et al. | 702/182 |
| 2002/0113877 A1 | * | 8/2002 | Welch | 348/148 |
| 2002/0143596 A1 | * | 10/2002 | Carmody | 705/8 |
| 2003/0055669 A1 | * | 3/2003 | Ryan et al. | 705/1 |

FOREIGN PATENT DOCUMENTS

JP   356079561   *   6/1981

OTHER PUBLICATIONS

American Innovations: Bullhorn Revision Bulletin (Bullhorn APM4, APM4A), Aug. 20, 2001 (11 pgs.) Campbell Scientific, Inc.: CR10X Measurement and Control System ( 8 pgs.) Microtel: Miscellaneous Articles (8 pgs.) Sensaphone: Remote Monitoring & Control Solutions (16 pgs.) Worldstone, Inc.: Innovative Monitoring and Control Solutions (6 pgs.).

(Continued)

Primary Examiner—Igor N. Borissov
(74) Attorney, Agent, or Firm—C. James Bushman; Browning Bushman P.C.

(57) ABSTRACT

The present invention provides an electronic regulatory compliance system and method that permits a regulatory agency to efficiently and accurately monitor thousands of environmental equipment installations, such as homeowner wastewater treatment plants, for compliance with regulatory requirements. The environmental equipment installations may be installed at different locations, operating on different inspection schedules, with different service companies, different owners, of different types, and be of different processing capacity. A personnel detector is preferably utilized to verify the actual physical presence of service personnel. In accord with the invention, each environmental equipment system is connected to a network that logs and time-stamps events that occur at each of the plurality of environmental equipment systems related to compliance with environmental regulations. In a preferred embodiment, a website is generated that permits a regulatory body to quickly view all accounts in noncompliance and automatically generate suitable notices of noncompliance for transmission to responsible parties.

73 Claims, 5 Drawing Sheets

OTHER PUBLICATIONS

QuadTech, LLC: (Miscellaneous Articles), (4 pgs.) Insightek The Power of Prediction: Kevin P. Rowland (2 pgs.) Water Hound: Schonstedt Instrument Company (3 pgs.) Scadata Rapid Wireless Data Systems (Miscellaneous Articles) (4 pgs.) Campbell Scientific, Inc, (Miscellaneous Articles) (10 pgs.).

Datastream (12 pgs.) Mission (2 pgs.) SJE-Rhombus:(4 pgs.) Strison Wireless Systems, LLC: Cell-Alert 2000 Remote Transmitting Unit Orenco Systems: Monitoring and Control Devices: (Miscellaneous Articles); May 16, 2003 (4 pgs.).

* cited by examiner

REGULATORY COMPLIANCE SYSTEM AND METHOD

BACKGROUND OF THE INVENTION

1. Field of the Invention

The present invention relates generally to monitoring systems and, in a presently preferred embodiment, provides a system and method for verifying regulatory compliance related to maintenance, operation, inspection, repair, and/or service contract renewal status of environmental equipment such as wastewater treatment systems.

2. Description of the Prior Art

Large municipal wastewater treatment plants employ daily personnel to monitor and maintain the plants; however, homeowners who live in non-municipal areas must often supply their own home wastewater treatment plant. Many low volume wastewater treatment plants are owned by individual homeowners or small entities who cannot realistically afford to employ personnel on a daily basis to maintain and repair their wastewater treatment facility.

Due to the high costs of daily service personnel for small systems, environmental regulations may require that manufacturers of small wastewater treatment systems be certified to make, sell, and service suitable systems and then permit the smaller certified systems to be inspected and tested on a less frequent, but periodic, basis, such as quarterly, biannually, and the like. A system may be certified after extensive testing of the system design by a suitable certification entity. Environmental regulations/certifications may also require automatic detection of system problems, e.g., a pump failure or other types of failures. If a problem is detected, regulations/certifications may also require that service personnel arrive within a relatively short time, e.g., within forty-eight hours, to promptly correct the problem. If the systems do not operate properly, then untreated wastewater from the system may eventually reach local streams. If such problems occur frequently with thousands of small systems, then environmental problems could result.

Therefore, environmental regulations/certifications relating to regular maintenance and inspection, as well as prompt repairs of wastewater treatment systems, are necessary and desirable to protect the environment. In some cases, non-governmental companies, such as NSF®, have been created to provide certification of equipment for compliance with NSF® requirements that relate to regulations, rules, and/or standards for such systems. Certification requirements may relate to maintenance, inspection, and repairs, as well as technical requirements for system outputs/operation such as suspended solids, pH, temperature, dissolved oxygen, color, oily film, foam, noise, biochemicals, odor, reliability, and the like. Thus, as used herein, environmental regulatory bodies may include governmental agencies, municipal governments, other governmental organizations, and private companies that effectively provide rules, standards, regulations, certifications, and the like for wastewater systems.

Due to such regulations, rules, and standards, which may vary from state to state, monitoring systems are presently available for wastewater treatment systems. Upon sensing a problem in the wastewater system, the monitoring systems may be required to produce a visual and auditory warning that will normally be readily detected by the homeowner. In this way, ideally, the homeowner would promptly contact his service company for repairs, and ideally, the service company would promptly repair the problem within the time limit required by regulation/certification. Some regulations require that the service company name be displayed on the system to permit easier contacting of the service company by the homeowner. Some systems provide a telephone dialer to directly contact the service company in case the homeowner does not recognize the problem immediately or see/hear the monitor warning signals. In some cases, the telephone dialer provides two-way communication to provide the ability for additional testing and remote servicing to thereby save service costs. In some cases, regulations may also require stickers and punch-out cards with the maintenance schedule mounted to the systems to verify that scheduled maintenance and/or testing has been timely performed. Nonprofit organizations, such as NSF®, may be used and/or required to certify the type of equipment for suitable operation and certify that the manufacturer provides suitable maintenance plans for the equipment owner and personnel qualified to maintain the equipment. Homeowners often are required to purchase a maintenance plan for a service time, such as two years, with the manufacturers or other service providers who are certified to install and maintain such plans. Homeowners are often required by regulations to renew their initial service contract, which may be for two years, for as long as the equipment is utilized; however, after extensive review and research in this industry, the inventor has identified significant regulatory problems that still exist with such systems and that are discussed hereinafter in some detail.

Consequently, there remains a need to provide an improved monitoring system to protect the environment. Those of skill in the art will appreciate the present invention, which addresses the above problems and other significant problems uncovered by the inventor that are discussed hereinafter.

SUMMARY OF THE INVENTION

Accordingly, it is an objective of the present invention to provide an improved system and method capable of monitoring a plurality of environmental equipment systems.

An objective of one preferred embodiment of the present invention is to provide an improved system and method that permits a regulatory body to automatically monitor compliance of regulations relating to inspection schedules, contract renewal status, and/or timely repairs of a plurality of environmental equipment systems that may be serviced by a plurality of different equipment manufacturers, that may be owned by a plurality of different homeowners or small entities, and may be located at a plurality of different locations.

An objective of another preferred embodiment of the present invention is to provide a computerized network for collecting/processing/organizing/disseminating data from the plurality of environmental equipment systems, including operational data; service personnel data; event time stamp data; responsibility data, such as ownership or other responsibility of the plurality of environmental equipment systems; and status data regarding maintenance contracts for the plurality of systems.

Yet another objective of a preferred embodiment of the present invention is to generate a website containing accumulated data accessible by regulatory bodies for determining compliance to regulations thereof.

These and other objectives, features, and advantages of the present invention will become apparent from the drawings, the descriptions given herein, and the appended claims. However, it will be understood that above-listed objectives and/or advantages of the invention are intended only as an aid in understanding aspects of the invention, are not intended to limit the invention in any way, and therefore do not form a comprehensive or restrictive list of objectives, and/or features, and/or advantages.

Accordingly, the present invention may provide an electronic regulatory compliance method for one or a plurality of environmental equipment systems. The environment equipment systems may be installed, if desired, at a plurality of different locations and may have, if desired, a plurality of different owners. If desired, the environmental equipment system(s) may be serviced by one or more service companies having one or more service personnel. A regulatory body is responsible for monitoring the environmental equipment systems with respect to scheduled inspection and timely repair of the environmental equipment systems. The method may comprise one or more steps, such as, for instance, automatically monitoring for operational status, such as equipment problems or the lack of equipment problems at each of the environmental equipment systems, automatically notifying the one or more service companies of the operational problems detected at the environmental equipment systems, electronically detecting a physical presence of the one or more service personnel at the environmental equipment systems, electronically storing inspection data related to the scheduled inspections requiring the physical presence of the one or more service personnel for each of the environmental equipment systems, automatically storing the operational data related to the operational problems detected at each of the environmental equipment systems, automatically storing the personnel data related to the physical presence of the one or more service personnel at the each of environmental equipment systems, and/or generating a report for the regulatory body related to compliance with the scheduled inspection and timely repairs for each of the environmental equipment systems.

Other steps may comprise providing capability on behalf of the regulatory body to automatically generate notices of noncompliance with the scheduled inspection and timely repairs utilizing the inspection data, the operational data, and the personnel data for the environmental equipment systems.

In one embodiment, the method may comprise storing responsible party data related to the plurality of owners for the plurality of environmental equipment systems and utilizing the responsible party data for addressing the notices of noncompliance.

In another embodiment, the method may comprise generating a computer network presence, such as a website, operable for selectively providing the inspection data, the operational data, and the personnel data to respective computers of the one or more service companies and the regulatory body and/or enabling selective generation of the report by the regulatory body utilizing the computer network presence or website and/or providing an inspection schedule for the environmental equipment systems that is accessible through the computer network presence or website by the one or more service companies.

In one preferred embodiment, the step of electronically detecting a physical presence of the service personnel may further comprise providing one or more mechanical switches adjacent each of the environmental equipment systems to be activated by the one or more service personnel for recording the physical presence. In another embodiment, the step of electronically detecting a physical presence may further comprise providing an electronic reader, e.g., a bar code reader or tag reader, adjacent each of the environmental equipment systems to be activated by a respective identifier such as a bar code or tag or magnetic strip or other automatic identifiers carried by each of the service personnel for recording the physical presence. The step of electronically detecting a physical presence may further comprise recording a time and date of the physical presence of the service personnel.

In the case of a regulatory compliance system operable with a plurality of environmental equipment systems the system may comprise one or more system elements, such as, for instance, an electronic monitor for producing operational data related to operational problems at each of the environmental equipment systems; a physical presence detector for producing personnel data related to a presence of the one or more service personnel at each of the environmental equipment systems; a clock for providing clock data, such as time and date stamps, related to the operational data and the personnel data for each of the environmental equipment systems, one or more processors for collecting the operational data, the personnel data, and the clock data; and one or more data storage elements for electronically storing inspection data related to the scheduled inspections requiring the physical presence of the one or more service personnel for each of the environmental equipment systems. The one or more storage elements may be operable for storing the operational data, the personnel data, and the clock data.

The regulatory compliance system may further comprise a computer network wherein the computer network may be operable for communicating data from the one or more storage elements with one or more computers of the regulatory body. The clock data may provide the time and date of the presence of the one or more service personnel at each of the environmental equipment systems. In one embodiment, the one or more network servers are programmed to generate a website accessible by the one or more computers of the regulatory body or a service/maintenance company. The website may comprise selectable options for generating reports related to compliance with the scheduled inspection and timely repairs for each of the plurality of environmental equipment systems.

Thus, the regulatory compliance system may comprise one or more network servers programmed to generate a website accessible by the one or more computers of the regulatory body or service/maintenance company. The website may comprise selectable options for generating reports related to compliance with the scheduled inspections and timely repairs for the plurality of environmental equipment systems. The selectable options may comprise an option to provide reports indicating noncompliance of the scheduled inspections and timely repair regulations, the reports indicating noncompliance may be printable with the address information of the responsible parties for the plurality of environmental equipment systems.

In operation, the system may comprise a method having one or more method steps, such as, for instance, providing an electronic connection from each of the environmental equipment systems to one or more computers; receiving digital data from the environmental equipment systems; electronically storing the digital data from the environmental equipment systems; making available an electronic connection accessible by the regulatory body for communicating the digital data from the one or more computers to the regulatory body; and/or providing that the regulatory body may utilize the digital data for generating reports related to the environmental equipment systems.

The regulatory body may generate reports related to compliance with the scheduled inspections and timely repairs for the environmental equipment systems and/or may generate noncompliance notices indicating noncompliance of the scheduled inspections and timely repair regulations for the environmental equipment methods including data related to communicating with parties responsible for the environmental equipment. The regulatory body may generate noncompliance notices if service contracts are not renewed as required.

In another embodiment, a third-party such as a person or body or entity that is recognized as being independent of the parties involved who has only a motivation to accurate report whether the regulations are complied with or not. A method of operation utilizing a third-party may comprise one or more steps such as, for instance, receiving digital data related to the timely servicing of the plurality of environmental equipment systems by one or more computers of an independent third party, electronically storing the digital data related to the plurality of environmental equipment systems, reporting from the independent third party to the regulatory body relating to the digital data received from the plurality of environmental equipment systems.

BRIEF DESCRIPTION OF DRAWINGS

For a further understanding of the nature and objects of the present invention, reference should be had to the following detailed description, taken in conjunction with the accompanying drawings, in which like elements may be given the same or analogous reference numbers and wherein.

Figure 1:
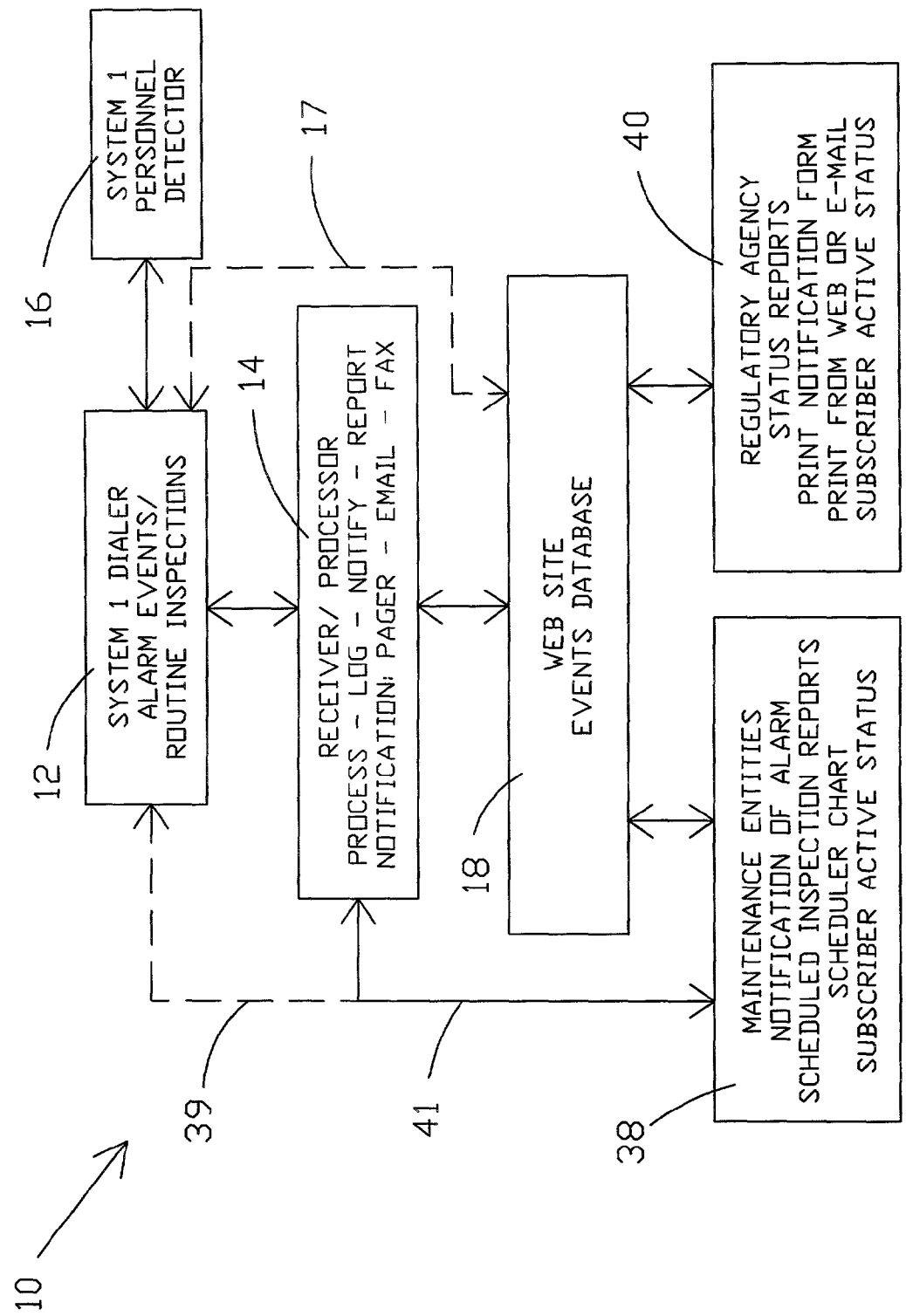
FIG. 1 is a schematic block diagram of an environmental compliance system in accord with the present invention.

While the present invention will be described in connection with presently preferred embodiments, it will be understood that it is not intended to limit the invention to those embodiments. On the contrary, it is intended to cover all alternatives, modifications, and equivalents included within the spirit of the invention.

DETAILED DESCRIPTION OF THE PREFERRED EMBODIMENTS

With small wastewater treatment systems, the systems may be serviced by different service companies, owned by different owners, and located at different locations. Generally, as used herein, different locations will also refer to different portions of land typically owned by different owners. The locations may be adjacent each other or separated by thousands of miles; however, the invention could also be utilized to monitor multiple environmental equipment systems on premises owned by a single owner such as a large plant, refinery, or the like with many different systems spread out over a wide area. The invention could also be utilized by a plurality of such plants or refineries located in different geographical areas of a country or in different countries to thereby permit improved compliance control by appropriate regulatory bodies.

Monitoring systems for environmental equipment such as wastewater treatment systems are known, as discussed hereinbefore; however, the inventor has determined that the following problems still exist that prevent or frustrate reliable environmental regulation oversight by the appropriate environmental regulatory body(s). The regulatory body typically has a limited number of employees and limited funds, and therefore has limited ability to conduct investigations of thousands (or tens or hundreds of thousands) of separately owned home wastewater treatment facilities to verify compliance with regulations. For instance, it is presently impractical for a regulatory body to reliably verify occurrence of equipment failures at each of thousands of homeowner wastewater treatment facilities and whether the equipment failures are timely reported or reported at all. Even for those systems that automatically report failures to the service company, the regulatory body has no practical way of determining if and when repairs have been made. Moreover, if the homeowner decides not to renew a maintenance contract with a certified service company, the regulatory body has little or no practical way of determining the renewal status of the maintenance contract without use of extensive personnel time. If repairs are made, there is also no practical way for the regulatory body to determine whether repairs have been made within the time period, e.g., forty-eight hours, that is required by the regulations. As well, there is no practical way for the regulatory body to determine, without extensive investigative time and money, whether routine inspections are consistently made according to the inspection schedules required by regulations and/or certification rules. For that matter, even the installation owner who may be ultimately responsible for compliance with regulations, such as a homeowner, may not know whether routine inspections in accordance with the terms of the service contract for which the installation owner pays are made as per regulations and/or whether repairs were made in a timely manner.

Figure 2:
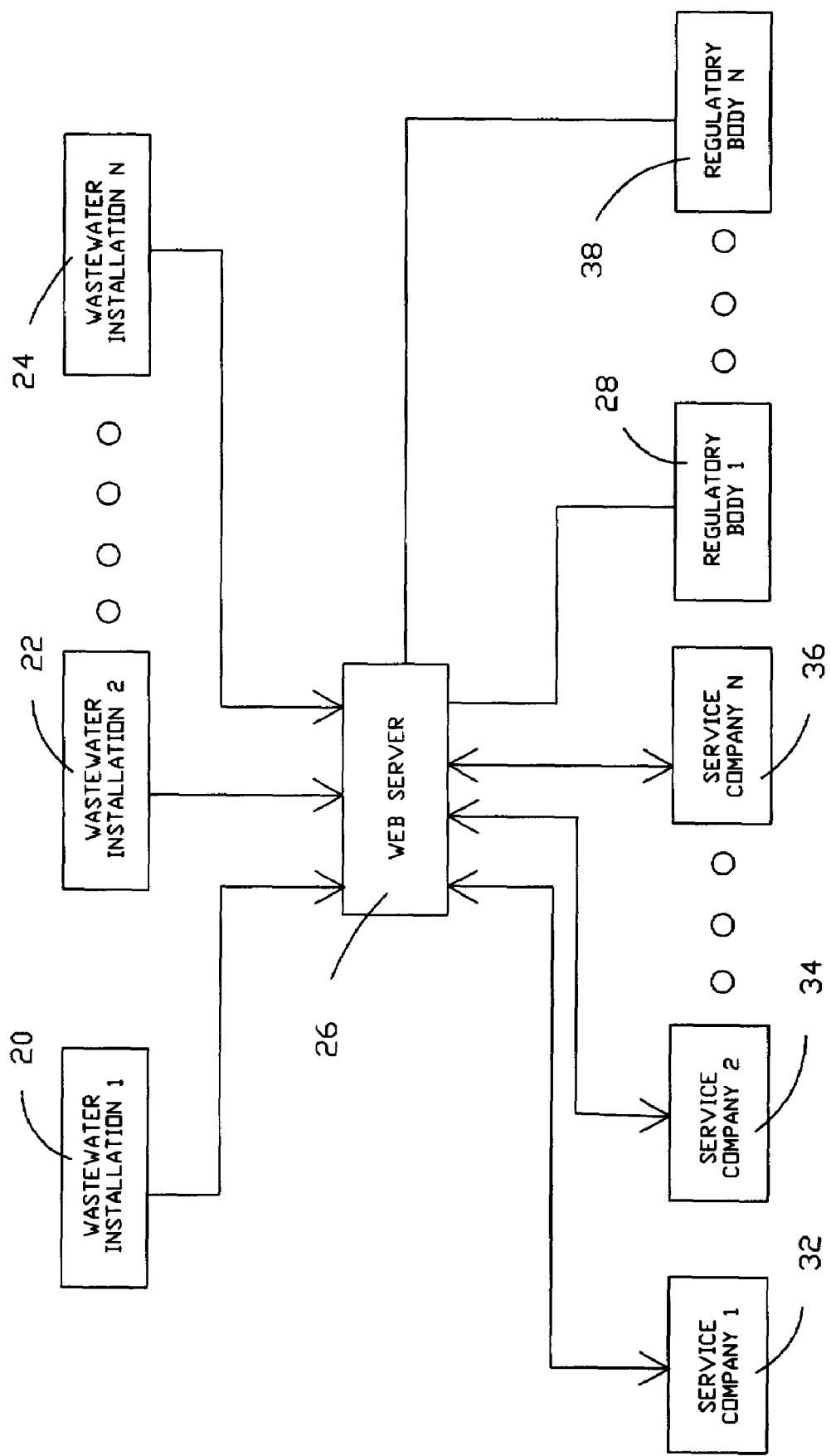
FIG. 2 is a schematic block diagram of one possible preferred embodiment showing a configuration of interconnections for an environmental compliance system in accord with the present invention.

With reference now to the drawings, and more particularly to FIG. 1, there is shown a presently preferred regulatory compliance system 10 in accord with the present invention. Compliance system 10 provides for remote monitoring and notification for use with a plurality of environmental equipment systems with different service companies and different owners. In the presently preferred embodiment, controller 12 may be mounted with each of a plurality of different environmental equipment systems, e.g., wastewater treatment systems, to collect data from each system and communicate the data from the plurality of systems to receiver 14, where the data is collected and stored. In FIG. 1, controller 12 is illustrated for use with a single system 1, but as shown in FIG. 2, a plurality of controllers 12 may preferably be utilized with any number N of wastewater systems as designated by numerals 20, 22, and 24. Thus, FIG. 1 discloses the basic operation of the invention with one environmental equipment system, but the present invention is most highly useful for efficiencies achieved when monitoring large numbers of units in the range of thousands and ten thousands of units or more.

The alarm events detected by controller 12 may be for a wide variety of events that use different sensors for producing an alarm signal. For instance, pump pressures, motor currents/voltages, fluid levels, component temperatures, effluent properties, and the like may be used to indicate normal operation, operation failure, impending failure, need for servicing, and the like. The information for each event may be stored and/or transmitted in any desired manner and may be controlled by suitable programming and/or circuitry.

In a presently preferred embodiment, service personnel detector 16 is provided to detect the physical presence of service personnel who are generally required by regulations to inspect the environmental equipment in accord with an inspection schedule and to timely repair the environmental equipment whenever repair is required according to the different sensors discussed above. Service personnel detector 16 may be used to determine when service starts and/or when the environmental equipment unit is turned on again after being shut down. Such information may be implied the facts detected by programming, such as no previous equipment operation, and/or may require additional input. In this manner, the manufacturer will know for warranty purposes when service began and be able to determine whether the environmental equipment system is still under warranty. Service personnel detector 16 may be provided in numerous different constructions that vary in cost, complexity, amount of data supplied, and so forth. In a presently preferred embodiment, service personnel detector 16 may comprise a single mechanical switch or button. When the service personnel inspects/repairs the environmental equipment system, the service personnel simply pushes the button. Controller 12 and/or receiver/processor 14 may utilize a clock to determine the time/date of the moment the button is pushed by the service personnel, thereby verifying physical presence of the service provider at the environmental equipment installation. Thus, the clock is utilized to produce a time stamp related to the service, whether the service is an inspection, a repair, or both. To prevent or limit unauthorized use, the button may have a lockout such that it can only be activated once every twenty-four hours. Alternatively, the button may operate with a program defining a time period in which a particular number of button pushes must be made within a specified time period and are used to verify physical presence of an authorized service technician, e.g., twelve button pushes within a one-minute time period. In another embodiment, the button may be covered with a lock to prevent unauthorized use. In another embodiment, the button should be pressed when the service personnel arrives and when the service personnel leaves to provide the length of time of service on location, which may be used for verification purposes. If identity information is also provided as discussed below, then a record of how the service personnel spent his time can be generated such as how much time was spent on each location, the travel time between locations, the sequence in which the service personnel worked on the environmental equipment systems, and so forth.

For instance, a keypad may be provided with a code known by each service personnel whereby the data comprises not only the time/date of service but also may provide the identity of the certified service personnel. Other information may also be provided by input through a keypad such as the type of service or repair, time on location, items repaired, and the like, as desired. Alternatively, authorization cards with magnetic strip readers, bar code readers, tag readers, and the like may be utilized to quickly provide time/date/identity information without the need for any keypad input. In another embodiment, the service personnel detector may be carried by the service personnel. For instance, handheld computers that may contain the service personnel's schedule for the day, equipment needed for repairs, directions to the locations, and the like may be utilized by the service personnel and may have a bar code scanner or other means to verify physical presence and identity of the service personnel. It will be understood that those skilled in the art could design other electronic means for performing the above-described functions. For instance, other means could include GPS or the like mounted to the service truck to perform as service personnel detector 16, which verifies physical presence, time/date, amount of time at the location, and/or other information that may be required by regulations to verify that the equipment has been timely inspected/repaired. Thus, many possible electronic configurations may be utilized to provide the function of service personnel detector 16. A single button with a programmed lockout or time period for a specific number of button presses is a presently preferred embodiment due to the low cost.

Preferably, controller 12 provides a visual or auditory indication to the service personnel, such as an L.E.D. indicator, to verify that his/her presence has been detected and thus ensure that the correct data will be transmitted, as discussed hereinafter.

Central receiver 14 and/or website servers 18 may be utilized in accord with one preferred embodiment of the invention to accumulate data from a plurality of wastewater installations and/or other data producers for distribution and utilization of the data to verify regulatory compliance. FIG. 2 shows one possible basic configuration of such a system whereby a plurality of any number N of wastewater installations as indicated at 20, 22, and 24 communicate with web server 26. Web server 26 may distribute information by an efficient low-cost means to any number N of regulatory bodies as indicated at 28 and 30 and as discussed hereinafter. Web server 26 may also collect data from other sources, such as subscriber contract active/cancelled status, along with other service contract information or other data, from any number N of service companies as indicated at 32, 34, and 36 for each of the plurality of wastewater installations 20, 22, and 24. In one embodiment, service from installation 10 does not start until paid for by the service company who is required to service the wastewater installation of concern. Therefore, it may be assumed that the service company has already been paid by the owner for the service contract. Thus, reports related to service contracts to be forwarded to the regulatory body may be generated automatically based on whether monitoring services utilizing unit 10 has been paid for by the service company. In one embodiment, an independent third party may operate central receiver 14 and notify the environmental body if contracts for monitoring using central receiver 14 and unit 12 are not renewed as discussed in more detail subsequently.

With reference again to FIG. 1, receiver/processor 14 may be utilized to receive data from any number N of environmental equipment installations, such as thousands of wastewater treatment systems as indicated by 20, 22, and 24. In a preferred embodiment, receiver/processor 14 may also be utilized to contact any number N of service companies to notify the respective service company of an alarm from any particular environmental equipment installation that requires servicing. Alternatively, website 18 may be utilized to provide alarm notifications to the appropriate service company 38.

Receiver/processor 14 and website 18 may be combined and effectively operate utilizing common electronic equipment or may be located at different locations. Website 18 may be a website on the Internet, a network, or a bulletin board accessible through a modem, an ISP, or any other suitable means for communicating from computer to computer. Alternatively, and/or simultaneously with receiver/processor 14, website 18 may receive information directly from controller 12 as indicated by communication line 17 which may be a telephone computer link up or any other data communication channel.

In response to an alarm notification, receiver/processor 14 and/or website 18 may provide a central monitoring station that identifies the location, type of alarm event and, if required, immediate notification to a designated service company either from receiver/processor 14, from website 18, or by other suitable means, as discussed in more detail subsequently. Service calls detected by service personnel detector 16 that are designated as routine inspections are preferably time-stamped and logged without the need to provide immediate notification to the service company, unless otherwise requested by the service company, whereby such an option may be provided on website 18. Notification warnings may be sent from receiver/processor 14 and/or website 18 by e-mail/fax/pager/program to the appropriate service company by other suitable means, if desired.

Although not the preferred embodiment, other communication interconnections may be utilized. For instance, transmitter 12 might also connect directly to service company 38 to provide a warning or notice of event as indicated by dotted communication line 39; however, in this case appropriate communications should be provided to update the records kept by receiver/processor 14. As one example for this configuration, transmitter 12 may also transmit event data to receiver/processor 14 and/or service company 38 may transmit data to receiver/processor 14 through solid communication line 41. Two-way communication may also be effected from maintenance entity 38 to controller 12 either by communication line 39 or communication line 41 to allow for testing, measurements, and controlling of the particular type of environmental installation involved. Other communication networks may be utilized for processing, forwarding, and storing data in accord with the methods of the invention as discussed herein.

Along with event data related to warnings, repairs, and inspections, receiver/processor 14 and/or website 18 may also receive and store data related to service contracts for each environmental installation and thereby automatically route the alarm to the correct environmental equipment installation. Receiver/processor 14 and/or website 18 stores the service contract data including renewal status and can send out renewal notices either directly to the homeowner or simply notify the appropriate service company. If the service contract is not renewed, as will normally be required by regulations, then receiver/processor 14 and/or website 18 stores this contract status information and preferably forwards or makes available the contract status information to regulatory agency 40. Regulatory agency 40 preferably may utilize software or systems in accord with the present invention that permit notification to the responsible parties, such as the homeowner and/or service company whose address and/or other contact information is stored by receiver/processor 14 and/or website 18, of noncompliance with regulations that require the homeowner to renew the service contract.

For example, in a preferred embodiment regulatory agency 40 may download form letters filled in and ready to mail. If desired, receiver/processor 14 and/or website 18 could also be utilized to automatically forward the form letter to the homeowner or responsible party on behalf of the regulatory agency and/or notify the agency by e-mail or other means that the noncompliance letter/e-mail/fax or the like has been sent and the date of mailing. Other types of communication besides form letters are also possible. When service contracts are renewed, the respective service company 38 notifies receiver/processor 14 and/or website 18 of the status, time period, particular installation, ownership and responsibility data, addresses, names, and so forth for the new contract. If monitoring utilizing unit 10 is not renewed, or if it is renewed, then such information may be implied while providing options to note changes. As discussed hereinafter, the respective service company may simply fills out a suitable online form in a website to effect this action. If desired, verification of contract renewal and terms thereof can be sent by receiver/processor 14 and/or website 18 to the service company and homeowner or other responsible party by any messaging means such as fax, e-mail, or the like.

Regulatory agency 40 can also obtain status reports regarding timely repairs, e.g., the exact time when the sensor originally signaled that repair was necessary and the exact time when the service personnel actually arrived at the environmental equipment system location. Thus, in one embodiment of the invention a status report can be printed by regulatory agency 40 that includes all repairs that were not made within the required time or that may not have been made at all. If desired, different levels of urgency can be assigned to the situations based on the length of time the repairs are overdue, whether repairs have been made at all, and/or repair history for a particular installation, a particular service provider, or a particular service personnel. Thus, form letters covering the different status types can be sent out automatically from regulatory agency 40 to the responsible parties.

In a similar manner, regulatory agency 40 can conveniently monitor whether the inspections for the environmental equipment systems have been timely performed. Receiver/processor 14 and/or web site 18 maintains the schedule required by regulations for inspection for each of the plurality of environmental systems and also records when a service personnel has arrived at the location. Suitable means may be provided to determine whether a service call is for repair, for inspection, or for both in conjunction with service personnel detector 16. For instance, if no repair warning has been sent, the service call may be presumed by programming of receiver/processor 14 and/or website 18 to be a routine inspection. Thus, because data is available regarding when inspections are required, as well as when inspections have been made, regulatory agency 40 can determine, by automatic control, exactly what level of compliance with the regulations has been achieved. Again, automatic notifications to responsible parties can be sent out from the regulatory agency to the appropriate responsible entity for nonconformance. Such notices may go to the service company if it appears the service company did not perform as per the service contract requirements. If desired, conformance letters could also be sent out for those homeowners and service companies providing conforming service as proof of a history of past conformance to regulations and/or history of repairs, inspections, and services as may be desired by other parties such as purchasers of the houses, real estate agencies, and the like.

System 10 may be utilized to signal when a wastewater system has been taken out of service or when service is initiated for the first time after manufacture or after the system has been out of service for repairs.

To significantly aid service companies 38, website 18 may also be utilized by service companies 38 to provide a record and an easily accessible schedule for each environmental equipment system for which the service company provides service. This schedule can be utilized in setting up work schedules for service personnel and so forth and provides a significant bookkeeping/logistics convenience for service companies 38. Additional records for each equipment system, including past history, anticipated types of repairs, maps, and the like, might be accessible by the appropriate service company and/or its service personnel. The service company may also be able to track personnel, determine efficiencies, determine time on locations, and so forth as may be useful for improved management.

Environmental equipment systems, such as wastewater systems, 20, 22, and 24, may be any environmental equipment systems for which environmental related regulatory oversight is required. For instance, according to American National Standard/NSF International Standard definitions, a residential wastewater treatment system is considered to be an organized and coordinated system of components that functions to treat wastewater generated by individual residences. A subdivision may have a plurality of residential wastewater treatment systems, each of which has to be in compliance with environmental regulatory requirements. Each wastewater treatment system is then considered an environmental equipment system for purposes of the present specification. As used herein, servicing includes maintenance, inspection, repairs, or others type of labor-related services when environmental equipment systems are involved whether or not repairs are actually made, initiated, delayed, or completed, and even if no action is taken. Servicing may also include remote repairs and monitoring. Service personnel provide the labor of servicing that should be made in a timely manner. Depending on regulatory requirements, service personnel may be required to be authorized representatives. Service personnel may be comprised of organizations, groups, individuals, or other entities that may be required to be authorized to distribute sell, install, and/or service environmental equipment systems such as wastewater treatment systems. Service companies may typically provide such service personnel. Service companies may include organizations, groups, individuals, or other entities. Generally, an owner for each environmental equipment system may be an individual, municipality, government, corporate, or other type of entity. The owner may typically be responsible for servicing such as the labor of maintenance/repairs/inspections and so forth of the environmental equipment system and may have contracted to have certified servicing performed by a service company utilizing certified personnel. The service company, which may be the owner's agent who has contracted to provide the service, may then also be a responsible party.

According to ISO Guide 2, which sets the internationally accepted definitions for product testing and certification, among many other things, the definition of a third-party is as follows: Person or body that is recognized as being independent of the parties involved, as concerns the issue in question. For instance NSF® is a third party that provides certification services but not does not sell the units or service the units in question. In one embodiment of the invention, receiver 14 and/or website 18 is operated by a third-party that reports to regulatory agency 40 regarding compliance or noncompliance with regulations. Preferably communications are automatic, but the third party may use any communication means including written reports and the like as may be utilized by the third-party to the regulatory body. The third-party is recognized as independent because the third party has no clear benefit if the duty to provide the labor of services such as repairs and inspections in accordance with regulations is not met. Preferably, the third-party receives payment for reliable reporting to thereby provide motivation to reliably and consistently report noncompliance. For instance, a manufacturer of environmental equipment and parts, who does not contract to provide services, does not have any clear benefit if inspections or maintenance or repairs are not properly made. Therefore a manufacturer is sufficiently independent to be third party for purposes of reporting noncompliance to regulations. This is so even though the manufacturer might in some cases be required, as a last resort, to supply some labor services under certain circumstances to maintain certification of the equipment, such as if a service company defaults on service contracts involving the equipment. Thus, a third party should be sufficiently independent of any motivation to avoid reporting noncompliance that a government body or certification body might reasonably recognize the third party as being independent. On the other hand, a service provider or environmental equipment system owner would not be independent because such parties could significantly benefit from cost savings if repairs or inspections are not made, of if the repairs/inspections are not made in a timely manner, or if the noncompliance with regulations was simply not reported. Thus, a third party would have no motivation to avoid reporting noncompliance with regulations and would not benefit by saving costs such as a service provider or system owner might. The main motivation for the third-party is to accurately track the actual status of compliance with regulations and the third-party may be paid for that service, just as other independent bodies such as companies such as NSF® are paid to provide independent certification. Thus, if desired, a third party entity, government body, or other independent company could be utilized to operate system 10 as a third party. For that matter, a purely automatic system may comply with the definition of a third-party because a machine has no motivation except to do that for which it is programmed. In this case, an independent third party might be required verify and certify operation of the machine to verify that the machine, such as system 10, is operating correctly to make accurate reports. Therefore, for purposes of the present specification a third-party may be an independent person, entity, or body, or may be a certified system such as system 10. A third party should be sufficiently independent that the third party does not benefit from noncompliance and should have a motivation to accurately report noncompliance with regulations. Such motivation might include as payment for accurate and reliable reporting. A third-party for this specification might therefore also comprise a system, such as system 10, or components thereof, owned and/or operated by an interested party if system 10 is certified or checked by an independent third-party and verified to act accurately and independently to determine whether or not the environmental regulations related to environmental equipment systems are being complied with.

Figure 3:
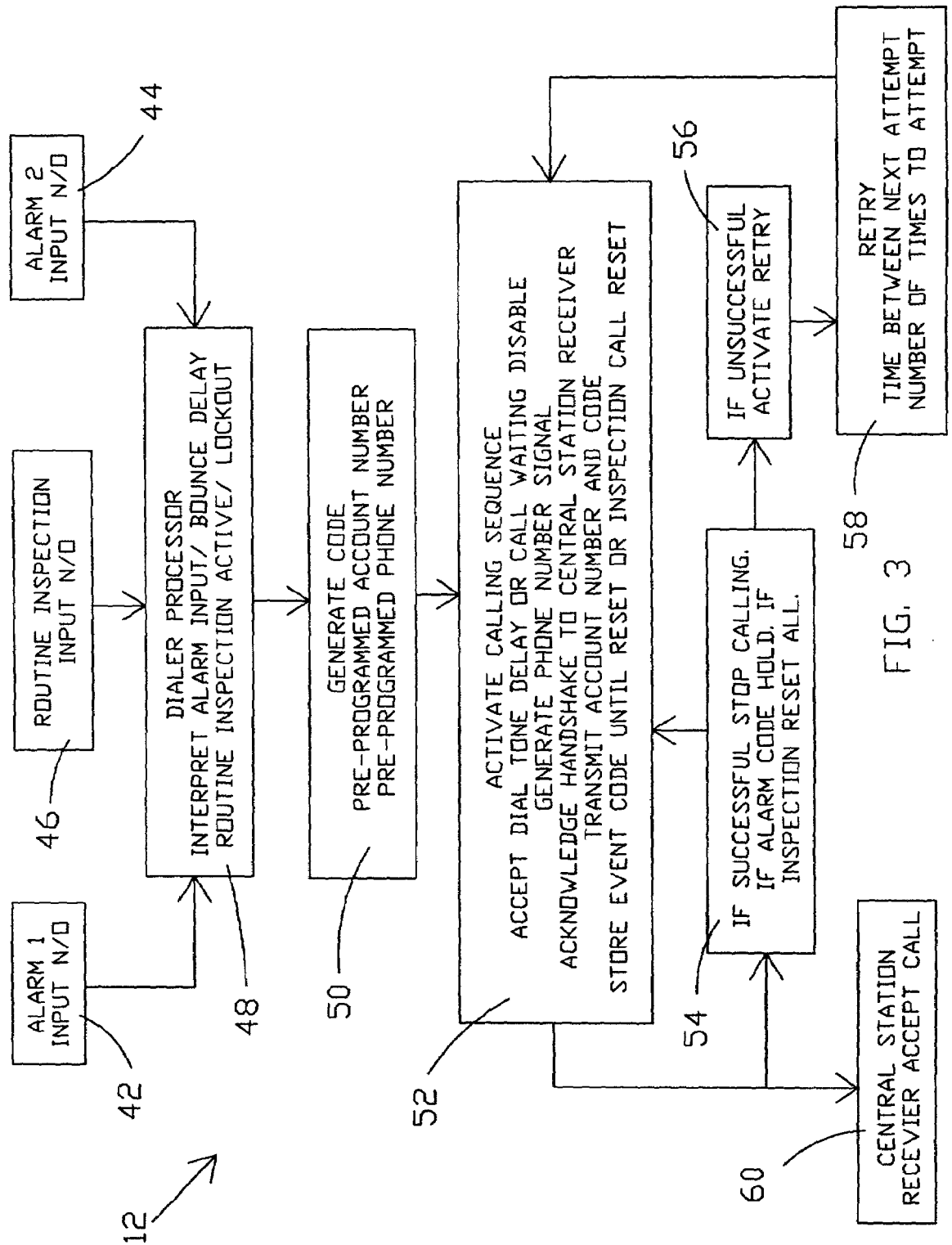
FIG. 3 is a schematic flow diagram relating to operation of an event data transmitter that may be utilized by each of a plurality of environmental equipment systems in accord with one possible preferred embodiment of the present invention.
Figure 4:
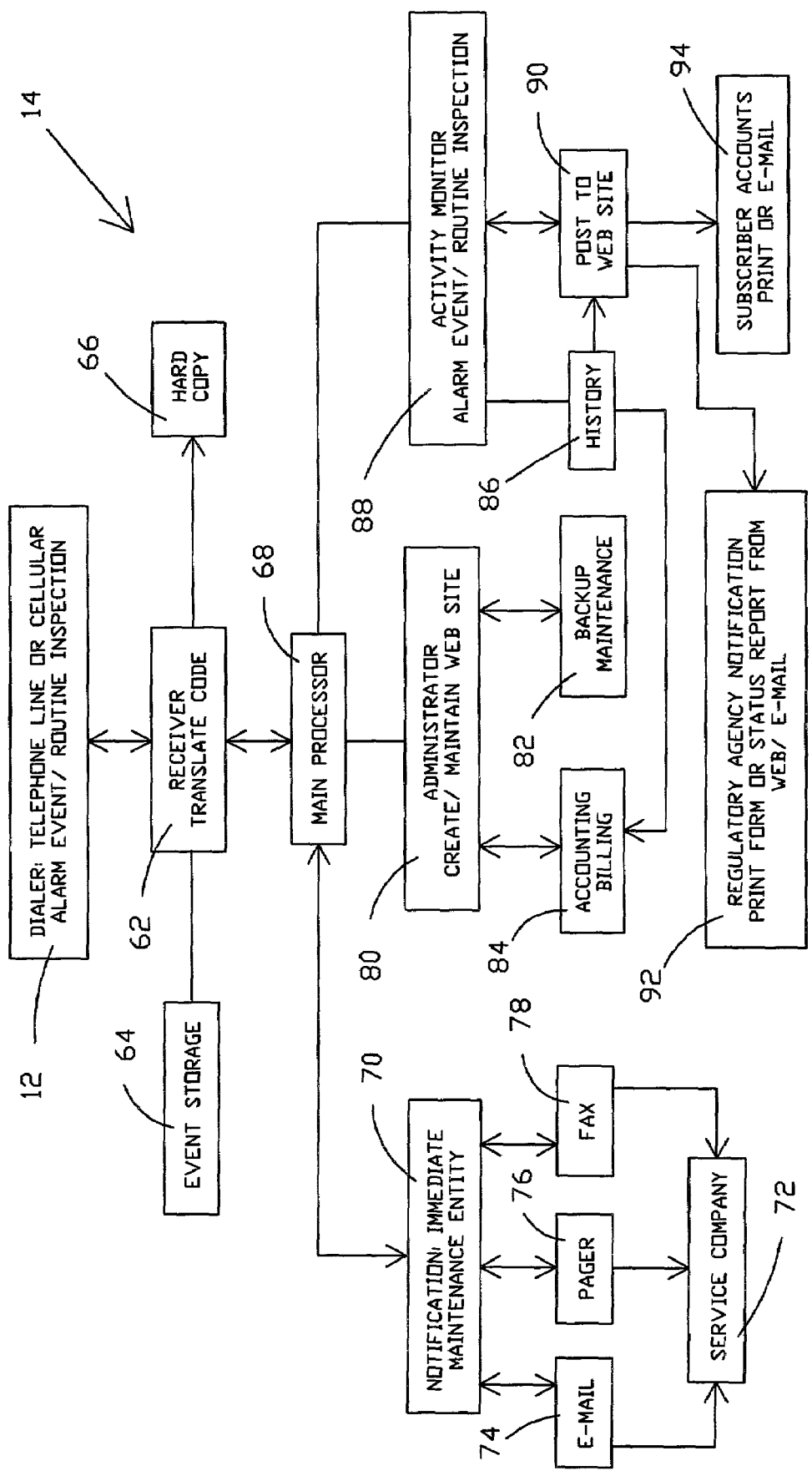
FIG. 4 is a schematic flow diagram relating to operation of an event data receiver that may be utilized to receive data from a plurality of event data transmitters such as those described by FIG. 4 in accord with one possible preferred embodiment.
Figure 5:
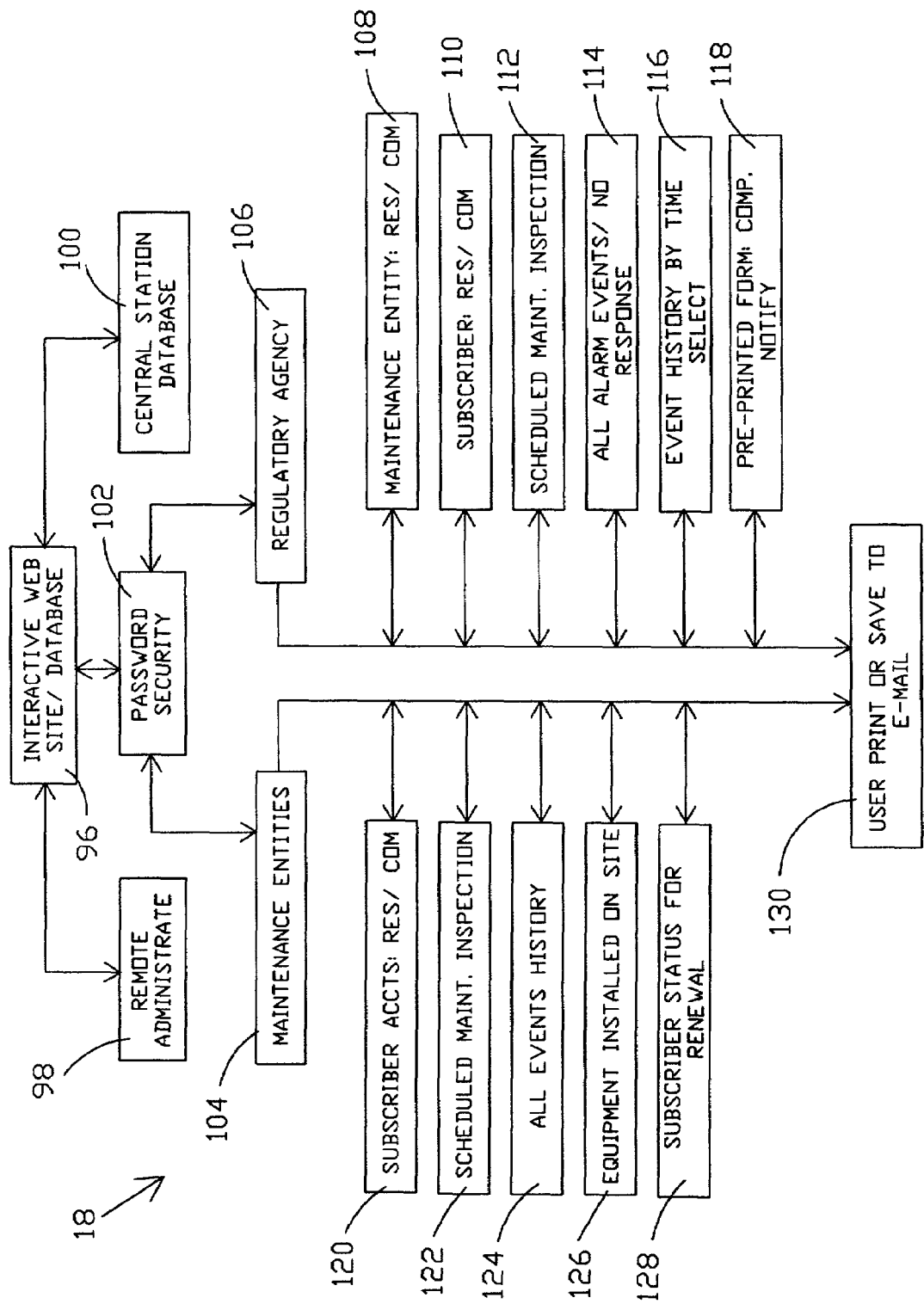
FIG. 5 is a block diagram for a website that may be accessed by a regulatory agent to obtain data related to compliance with regulatory requirements, such as scheduled maintenance, timely repairs, maintenance contracts, and responsible parties, for a plurality of environmental equipment systems located in different locations in accord with one possible embodiment of the present invention.

FIG. 3, FIG. 4, and FIG. 5 provide additional details for a presently preferred regulatory compliance system 10 as discussed in general terms hereinbefore in relation to FIG. 1 and FIG. 2.

FIG. 3 provides a schematical breakdown of certain features/functions of controller 12, such as the transmitter functions. As indicated and discussed above, various types of inputs may be provided from sensors, such as equipment failure alarms 42 and 44. As discussed above, many different types of service personnel detectors 16 can be utilized to provide routine inspection/repair service call input 46. For example, alarms 42 may include two amperage sensors that sense over currents in engines in wastewater systems whereby less expensive service is needed before the engines break down and require major repairs. If a wastewater system has two engines that may be used alternatively, then the spare engine could be used while one engine is being repaired. Utilizing two over current sensors with one sensor one each engine would allow continued operation of the facility, while shutting down either engine that is drawing too much current. Dialer 48 then sends a message to report the over current condition so that repairs can be made. Other controls shift the work load to the other engine.

For initial processing of event data, dialer/processor 48 may be programmed to sense short-term false alarms. For instance, with certain sensors a signal may occur that if monitored for a longer period, perhaps two minutes, will then go back to a normal range. For instance, a fluid level may rise momentarily above the trigger level but then soon drop back into the normal range whereby service is not indicated. Thus, false alarms can be reduced in some cases by programming delays and signal averaging into the design of dialer/processor 48. Thus, dialer/processor 48 may be utilized to interpret the alarm input and be programmed to respond accordingly. As another example, dialer/processor 48 may be utilized to provide bounce delays for a mechanical button or switch such as a programmed lockout time period or other means after an initial contact to verify that the service personnel actually activated the signal. Therefore, input 46, which may, for instance be provided by personnel detector 16 may therefore be from a single switch or button, multiple switches such as a key pad, an electronic reader of some type, or any other means to indicate the actual physical presence of a service provider. Input 46 may also include data that identifies the particular service personnel such as a tag, magnetic strip, bar code, or the like.

Processor 48 or other components in receiver 14 may be utilized to determine the type of service provided by the service personnel, e.g., repair or routine inspection or both. Thus, processor 48 may refer to whether an alarm is active or not to interpret the meaning of the call. If a keypad is utilized, the service personnel could also indicate this information by inputting the appropriate code for either a repair service call, routine inspection, or both.

Dialer 50 may then be used to send data to receiver 14 either by a standard telephone line or by cellular telephone where a standard telephone line is not available. While a dialer is a low-cost embodiment in accord with a presently preferred embodiment, any other type of data communication line could be utilized. If desired, dialer 50 may utilize the telephone communications industry standard 4+2 format. Dialer 50 may in one embodiment utilize a code, such as a hexadecimal code or other type of code, that identifies a unique account number associated with the particular environmental equipment system, the alarm event, and/or the onsite report recognition of the physical presence of a service personnel. Dialer 50 may contain the phone number to be dialed in memory. The phone number may be changed by two-way communication from receiver 14, as desired. Account information will be transmitted that permits receiver 14 and/or website 18 to identify the particular environmental equipment system, type thereof, manufacturer, owner, installer, service contract status, service company, and so forth.

Programming of dialer 50 is indicated at blocks 52, 54, 56, 58, and 60 to thereby control the operation of dialer 50 in a presently preferred manner. For instance, the type of phone line connection may be programmed therein for receiver 14, handshake connections, protocol for data, decision-making as to resetting of alarms, and so forth. If a successful call is completed as indicated at 54, no further calls are needed, and depending on whether the code is for an alarm or for an inspection, a reset may or may not be made. If the call is not successful, as indicated at 56, then retry routine 58 may be activated whereby the time between the next retry is determined along with the number of retries attempted. For instance, phone lines may be down, and therefore routine 58 may delay further attempts until the next day after a certain number of attempts have been made. Busy signals may produce a different response. If receiver 14 accepts the call as indicated at 60, then the appropriate resets are made. While this program of operation is presently desired, other possible dialer operation formats may also be used.

FIG. 4 provides an overview of a presently preferred embodiment of receiver/processor 14. As discussed earlier, dialer 12, or another type of transmitter, sends data to receiver 62 by telephone lines, cellular transmission, or any other type of data link. Various communication checks such as parity checks, acknowledgments, and the like can be used to eliminate transmission of incorrect data.

While receiver 62 is preferably a single receiver, receiver 62 might also comprise multiple receivers that act together. For instance, there could be a separate receiver 62 for different geographical areas or countries, which then transmit the data to another receiver or group of receivers; however, in one presently preferred embodiment, all data is preferably stored in a manner to be accessible in real time by the regulatory body without the need to search multiple locations and/or repeatably update a plurality of remote data collecting systems 62 to a central station or website 18. The collected data, as discussed hereinbefore, relates to events that occur at each of a plurality of environmental equipment installations. Upon receipt, the data is translated by receiver 62 and the raw data is preferably stored in a data storage medium 64. Receiver 62 may also comprise a clock to time and date the receipt of each event. If desired, a time stamp may already have been attached to the event data from dialer 12, as discussed above. If no previous time stamp was produced, or even if one was produced, the time stamp of receiver 62 indicates when the data was received by receiver 62. The time-stamp information is utilized to determine timely compliance with inspection requirements and repairs. If desired, a hard copy of all events for any desired period or for each event logged may be printed at 66. Main processor 68 is programmed to make decisions upon receipt of the data. For instance, if a warning event occurs such that repairs are necessary, then notification is made at 70. Processor 68 stores information that permits contacting the particular service company 72 that has an existing contract for servicing the particular environmental equipment system for which a repair warning event has been received.

Notification module 70 may comprise programmed equipment and/or may comprise a programming module operable to contact service company 72 by virtually any desired communication format such as, for instance, e-mail 74, pager 76, and/or fax 78. By communications with the website 18, the service company may have an option to select a desired communication means. In one embodiment, if desired, a selected service personnel could be directly paged by notification module for a particular group of environmental equipment, although service company 72 may typically prefer to have all communications go therethrough to continually update event logging records.

Main processor 68 may be programmed by system administrator 80, who may contact main processor 68 through website 18, by an Internet network connection, LAN, or another type of network connection. Alternately, system administrator 80 may contact or operate the website through main processor 68. Backup maintenance 82 for the system may be supplied depending on the particular configuration utilized and may comprise backup programs, data, and the like to restore the system in case of errors, power failures, and the like. Administrator 80 also preferably sets up accounting/billing module 84. Accounting/billing module 84 monitors the number of events from history module 86 and may determine pricing based on the number of data events that occur for each environmental equipment system in conjunction with other monthly fees and services provided.

Activity monitor 88 may be used to classify the events and store a log of events. For instance, the events received by receiver 62 might be classified as to whether they are alarm events, routine inspections, system start-up, system shutdown, contract renewal, and so forth. The cataloged data may be supplied to history module 86 where it may be utilized for accounting/billing purposes. Data may also be posted to website 18 as indicated at 90. In a preferred embodiment, from website 18 the regulatory agency can receive notifications, make inquiries, print forms, obtain status reports, and so forth as desired. The regulatory agency could also send messages to the respective homeowners, responsible parties, or service company through the website, as desired. Subscribers 94, such as service companies who subscribe to features such as schedulers that keep track of all inspection requirements for each unit, may also contact the website.

FIG. 5 provides an overview of various preferred functions of website 18 that may be produced by one or more servers and with data storage at one or more locations. Thus, interactive website/database 96 may comprise electronic equipment located at the same general location as receiver/processor 16 and/or be located at different locations. Thus, website 18 servers and receiver/processor 16 may or may not utilize common equipment, as desired, and may or may not be located at the same physical location.

An administrator may remotely operate interactive website 96 as indicated at 98. Website 18 may utilize central station database 100 for data storage and data backup storage, as desired. Preferably, access to website 98 is by unique password security as indicated at 102. Thus, each maintenance entity 104 and each regulatory agency 106 has its own password. The passwords may preferably provide, or be associated with, different levels of access and/or services.

Items 108, 110, 112, 114, 116, and 118 give examples of some presently preferred services available to the regulatory agency in accord with the present invention. For instance, the regulatory agency may obtain service company information 108, such as listings of environmental units under contract, the make of the units, the dealer/installer, the address or physical location of the units, the history of service for the service company in percentages, noncompliance past history, and so forth. Likewise, owner information 110 is available, such as addresses and names or, if the owner is not responsible, other parties, such as operators, companies, or local governments. Likewise, a history of past events, responses, and so forth as well as a history of equipment failures may be obtained. This information may also be used as one factor in extended time verification of operation or for granting certification for certain types of units. Scheduled maintenance/inspection information 112 is readily available, and histories for each type of equipment can be obtained. From this and event information such as the physical presence data and/or data regarding classification as to inspection/repair visits, the regulatory agency can also determine whether inspections have been timely performed in compliance with the regulations. The regulatory agency can also obtain listings of all alarm events as indicated at 114, the times of the related responses, or whether any response has been made. Histories with respect to particular service companies and/or owners can also be obtained. Event histories may also be retrieved for particular time periods as indicated at 116. To reduce the time required for the regulatory agency, preprinted noncompliance forms can be produced at 118 that are addressed to the responsible parties. It will be understood that the data can be organized and retrieved in many different ways and formats and that many options may be provided for convenience and speed of operation by the regulatory agency. An oversight agency, through password supervision, may access accounts of a local agency and review their status. Searching may be made in many different ways such as by specific time period, name, equipment type, subscriber listings, service company, and so forth. Thus, the present invention also allows an oversight agency to review local agency compliance.

Likewise, service companies 104 can obtain many helpful and valuable services through interactive website 96 as indicated at 120, 122, 124, 126, 128, and 130. Moreover, service companies can enter a significant amount of data into website 96 for use by the service companies in the future for scheduling such as future inspections, future contract renewal requests for homeowners, and the like. Thus, at subscriber information 120, information about the service company is input including contact information, location, and so forth. Scheduled maintenance/inspection schedules are available at 122 and may be provided as a convenience for companies that might otherwise pay significant sums to develop or purchase software for scheduling purposes. The website may be used by companies to generate bills, renewal notices, service notices, and other comments or advisories to customers or other interested parties. In one embodiment, service personnel that are in a particular area for other reasons such as repairs may be able to log into or have the service company log into the scheduler to determine if efficiencies can be achieved by performing inspections while the service personnel is already in that area. Thus, scheduler function 122 is likely to reduce operating costs for the service company. Service companies may also be able to obtain event histories 124 relating to histories of operation, timely response, timely repair, records of repair for each service personnel and for each environmental equipment installation, types of installations, and so forth. If desired, the data may be limited to data related to those service companies' operations. The type of equipment installed on each site may be available at 126 along with repair/maintenance history and so forth. At 128, the service company inputs information about the subscriber contract status and may have preprinted forms mailed to the subscriber before the contract expires, with perhaps standardized warning letters to advise about regulations requiring renewal of the service contract. The users may print or save the above and other information to e-mail as desired as indicated at 130.

Thus, in accord with the operation of the present invention, as discussed herein, a regulatory agency may set up an account having a password 102 to website 96 that enables the agency to view all accounts. If desired, only those accounts in noncompliance can be viewed and may be cataloged in various ways such as, for instance: alarm with no response, inspection not reported in a designated time period, or an account not actively in monitoring status. The present invention may verify compliance with standards such as the NSF International specification for third-party certification that requires that a wastewater treatment facility be repaired within 48 hours after an alarm. The present invention may also verify compliance with NSF International specifications that requires that a unit be inspected on a minimum semiannual basis. The present invention may also verify NSF International specifications requiring a service agreement to be renewed at least on an annual or biannual basis. Additionally, the regulatory agency is able to view the entity responsible for maintaining the equipment, the contact person, the telephone number, the equipment installed on location, and the history of all monitoring events. Should notification be necessary for noncompliance, a preprinted form may be downloaded from the website with the subscriber's information automatically inserted into the form for mail-out. The service company also benefits by the present invention in that a password-protected account is available showing all subscriber accounts due for maintenance, contract renewal, service personnel records for those embodiments where the particular service person is identified, and an all-events history for the equipment.

Although a particular compliance system organization has been described, other computerized compliance system organizations could be used. For instance, each service personnel could have a handheld computer that communicates data to a desired location. Computer interconnections between the handheld computer and controller 12 could be made either by cable or wirelessly. The inspection data and details of repair may then be transferred by the handheld computer. Thus, the system may be set up quite differently and still effect the same functions and purposes. Each service company might set up a system that communicates between the service personnel, the unit, and a centralized data collection center whereby the data is available from all sources to the regulatory agency.

The foregoing disclosure and description of the invention is therefore illustrative and explanatory of a presently preferred embodiment of the invention and variations thereof, and it will be appreciated by those skilled in the art that various changes in the design, organization, order of operation, means of operation, equipment structures and location, methodology, and use of mechanical/electrical/software equivalents, as well as in the details of the illustrated construction or combinations of features of the various elements, may be made without departing from the spirit of the invention. As well, the drawings are intended to describe the concepts of the invention so that the presently preferred embodiments of the invention will be plainly disclosed to one of skill in the art but are not intended to be manufacturing level drawings or renditions of final products and may include simplified conceptual views as desired for easier and quicker understanding or explanation of the invention. As well, the relative size and arrangement of the components may be greatly different from that shown and still operate within the spirit of the invention as described hereinbefore and in the appended claims. It will be seen that various changes and alternatives may be used that are contained within the spirit of the invention.

Accordingly, because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative of a presently preferred embodiment and not in a limiting sense.

What is claimed is:

1. A method for determining regulatory compliance of a plurality of wastewater treatment systems, said plurality of wastewater treatment systems being installed at plurality of different locations, said wastewater treatment systems being serviced by at least one service company having at least one service personnel, there being at least one regulatory body for monitoring said plurality of wastewater treatment systems with respect to timely servicing of said plurality of wastewater treatment systems, and a third party which is an independent non-governmental entity, said method comprising:

installing wastewater treatment equipment for each of said plurality of wastewater treatment systems, said plurality of wastewater treatment systems comprising a multitude of separately owned wastewater treatment systems at a multitude of different physical locations, each of said multitude of separately owned wastewater treatment systems requiring periodic inspections;

installing with said wastewater treatment equipment at least one first sensor adapted for detecting abnormal operating conditions of said wastewater treatment equipment;

installing with said wastewater treatment equipment at least one second sensor adapted for electronically detecting a physical presence of said at least one service personnel;

providing at least one electronic storage by said third party;

detecting abnormal operating conditions for at least one of said plurality of wastewater treatment equipment utilizing said at least one first sensor;

upon said detecting of abnormal operating conditions, electronically notifying said at least one service company of said abnormal operating conditions;

electronically detecting a physical presence of said at least one service personnel said plurality of wastewater treatment systems utilizing said at least one second sensor;

upon said electronically detecting of said physical presence, electronically determining a date of said physical presence of said at least one service personnel;

electronically storing said date of said physical presence in said at least one electronic storage; and accessing said at least one electronic storage and generating a report for said regulatory body, said report comprising said date associated with said physical presence.

2. The regulatory compliance method of claim 1, wherein said third party provides certification services governing operation of said plurality of wastewater treatment systems.

3. The regulatory compliance method of claim 1, further comprising storing a schedule of said periodic inspections in said at least one electronic storage, and comparing said date to said schedule to provide with said report whether said periodic inspections were timely made.

4. The regulatory compliance method of claim 3, further comprising:

generating a website and providing access to said at least one electronic storage of said third party through said website.

5. The regulatory compliance method of claim 4, further comprising:
   generating said report by said regulatory body utilizing said website.

6. The regulatory compliance method of claim 4, comprising selecting a format of said report by a computer of said regulatory body.

7. The regulatory compliance method of claim 4, further comprising:
   providing access to said schedule of said periodic inspections through said website to said at least one service company.

8. The regulatory compliance method of claim 1, wherein said step of electronically detecting said physical presence further comprises installing at least one mechanical switch for use as said second sensor adjacent each of said plurality of wastewater treatment systems to be activated by said at least one service personnel.

9. The regulatory compliance method of claim 1, wherein said step of electronically detecting e said physical presence further comprises installing an electronic reader for use as said second sensor adjacent each of said plurality of wastewater treatment systems to be activated by a respective identifier carried by each of said at least one service personnel.

10. The regulatory compliance method of claim 1, electronically determining whether a respective service contract between at least one owner of said plurality of wastewater systems and said at least one service company has been timely renewed.

11. The regulatory compliance method of claim 10, further comprising:
   electronically generating notices of noncompliance to said at least one owner of said plurality of wastewater systems when said service contract has not been timely renewed.

12. A regulatory compliance system operable with a plurality of wastewater treatment systems at a plurality of different physical locations, said wastewater treatment systems being serviced by service personnel of at least one service company, there being a regulatory body for monitoring said plurality of wastewater treatment systems with respect to timely servicing of said plurality of wastewater treatment systems, said system comprising:
   an electronic monitor at each of said plurality of wastewater treatment systems comprising at least one first sensor adapted to detect abnormal operating conditions of wastewater treatment equipment and to electronically transmit signals representative of said abnormal operating conditions if said abnormal operating conditions occur;
   a physical presence detector comprising at least one second electrically operated sensor adapted to detect a presence of said at least one service personnel at each of said plurality of wastewater treatment systems;
   at least one clock for determining a date of a detected abnormal operating condition and a date of a detected physical presence of said service personnel at each of said plurality of wastewater treatment systems;
   at least one storage member for electronically storing said date of said detected abnormal operating condition and said date of said detected physical presence of said service personnel and for storing a maintenance inspection schedule for said plurality of wastewater treatment systems; and
   at least one processor programed for accessing said at least one storage member and generating at least one report for said regulatory body, said report evidencing said time of said detected physical presence of said service personnel for determining timely compliance with said maintenance inspection schedule.

13. The regulatory compliance system of claim 12, further comprising:
   a computer network operated by a third party which is an independent non-governmental entity and does not sell or repair or own said plurality of wastewater treatment systems, said computer network being operable for communicating data from said at least one storage member with at least one computer of said regulatory body.

14. The regulatory compliance system of claim 12, wherein said date comprises a time of said detected physical presence of said service personnel at each of said plurality of wastewater treatment systems.

15. The regulatory compliance system of claim 12, wherein said at least one storage element is utilized for storing names of a plurality of different owners for said plurality of wastewater treatment systems.

16. The regulatory compliance system of claim 15, wherein said at least one storage element stores address information for contacting said plurality of different owners.

17. The regulatory compliance system of claim 12, further comprising at least one server operated by a third party which is a non-governmental entity, said at least one server being programmed to generate a website.

18. The regulatory compliance system of claim 17, wherein said website is operable for generating information comprising compliance with scheduled inspections and timely repairs for said plurality of wastewater treatment systems.

19. The regulatory compliance system of claim 17, wherein said website is operable for generating information comprising failure to renew service contracts along with address information for transmission to responsible parties for said plurality of wastewater treatment systems.

20. A regulatory compliance system operable with a plurality of environmental equipment systems, said plurality of environmental equipment systems being serviced by service personnel, there being a regulatory body for monitoring said plurality of environmental equipment systems, said system comprising:
   at least one first electronic monitor physically positioned at each of said plurality of environmental equipment systems for automatically producing and communicating a first signal representative of abnormal operating conditions for said plurality of environmental equipment systems;
   at least one second electronic monitor for detecting and communicating a second signal representative of a physical presence of said service personnel at each of said plurality of environmental equipment systems;
   a receiver for electronically receiving said first signal and said second signal;
   at least one data storage in electronic communication with said receiver operable for electronically storing dates of occurrences of said first and second signals and for electronically storing a schedule of required inspections of said plurality of environmental equipment systems and for storing names of responsible parties for said plurality of environmental equipment systems; and
   at least one network server programmed to generate a website accessible by said at least one computer of said regulatory body, said website comprising selectable options for generating reports.

21. The regulatory compliance system of claim 20, wherein said receiver and said at least one data storage and said at least one network server is operated by a third party which is a non-governmental entity.

22. The regulatory compliance system of claim 20, further comprising at least one computer program operable to determine noncompliance with said schedule of required inspections and for generating noncompliance reports indicating noncompliance with scheduled inspection requirements for said plurality of environmental equipment systems.

23. The regulatory compliance system of claim 20, wherein said selectable options comprise an option to provide noncompliance reports indicating failure to renew a service contract.

24. The regulatory compliance system of claim 20, further comprising selectable printing options accessible by said regulatory body for printing notices of noncompliance with said schedule of required inspections and for transmission to said responsible parties for said plurality of environmental equipment systems.

25. A method for determining regulatory compliance of a plurality of environmental equipment systems, said environmental equipment systems being serviced by service personnel, there being a regulatory body for monitoring said plurality of environmental equipment systems, said method comprising:

creating at least one electronic connection from each of said plurality of environmental equipment systems to at least one monitoring computer positioned remotely from said plurality of environmental equipment systems;

providing at least one electrically operated first sensor at each of said plurality of environmental equipment systems to detect abnormal equipment operating conditions;

providing at least one electrically operated second sensor to detect a physical presence of said service personnel at each of said plurality of environmental equipment systems;

operatively connecting at least one transmitter to said at least one first sensor and said at least one second sensor for transmitting signals over said at least one electronic connection indicative of said abnormal equipment operating conditions and said detected physical presence to said at least one monitoring computer;

electronically connecting between said at least one monitoring computer and at least one computer of said regulatory body for transmitting signals indicative of said abnormal equipment operating conditions and said detected physical presence and generating a report for said regulatory body comprising said detected physical presence at said plurality of environmental equipment systems.

26. The regulatory compliance method of claim 25, wherein said step of electronically connecting further comprises:

electronically connecting said at least one computer of said regulatory body to a network.

27. The regulatory compliance method of claim 25, further comprising:

generating reports on compliance with scheduled inspections and timely repairs for said plurality of environmental equipment systems.

28. The regulatory compliance method of claim 25, further comprising:

storing a date for each said detected physical presence of said service personnel at said plurality of environmental equipment systems.

29. The regulatory compliance method of claim 25, further comprising providing a third party which is an independent entity for operating said at least one monitoring computer.

30. The regulatory compliance method of claim 29, further comprising storing names of parties responsible for said plurality of environmental equipment systems.

31. The regulatory compliance method of claim 25, further comprising storing a schedule of required maintenance inspections for each of said plurality of environmental equipment systems.

32. The regulatory compliance method of claim 25, farther comprising:

storing at least a date of each said detected physical presence of said service personnel at said plurality of environmental equipment systems; and generating reports of noncompliance with scheduled inspections and timely repairs for said plurality of environmental equipment systems.

33. The regulatory compliance method of claim 25, further comprising:

generating noncompliance notices indicating failure to renew a service contract.

34. The regulatory compliance method of claim 25, further comprising:

generating a record of when said environmental equipment system starts initial operation for a first time or after a shutdown wherein repairs are made utilizing data produced by said at least one second sensor.

35. A method for determining regulatory compliance of a plurality of environmental equipment systems, said environmental equipment systems being serviced by service personnel, there being a regulatory body for monitoring said plurality of environmental equipment systems, said method comprising:

electronically generating digital data by electronic sensor equipment at each of said plurality of environmental equipment systems, said electronic sensor equipment being adapted for detecting abnormal operation of environmental equipment and a physical presence of said service personnel;

electronically collecting and storing said electronically generated digital data from said plurality of environmental equipment systems;

producing a website and posting said electronically generated digital data from said plurality of environmental equipments onto said website; and accessing said website by said regulatory body whereby said regulatory body can determine dates of detection of said abnormal operation of said environmental equipment and said regulatory body can determine dates of detection of said physical presence of service personnel at said plurality of environmental equipment systems.

36. The regulatory compliance method of claim 35, further comprising:

providing access to said website by at least one service company whereby at least selective of said digital data from said plurality of environmental equipment systems is retrievable by said at least one service company.

37. The regulatory compliance method of claim 35, further comprising:
providing that said regulatory body utilizes said digital data for generating reports.

38. The regulatory compliance method of claim 35, further comprising:
generating reports of noncompliance with scheduled inspections and timely repairs for said plurality of environmental equipment systems.

39. The regulatory compliance method of claim 38, further comprising:
generating noncompliance notices indicating noncompliance of said scheduled inspections and timely repair regulations for said plurality of environmental equipment methods, said noncompliance notices including names of parties responsible for said plurality of environmental equipment systems.

40. The regulatory compliance method of claim 39, wherein said noncompliance notices comprise address information for contacting said parties.

41. The regulatory compliance method of claim 35, further comprising storing data used for communicating with parties responsible for said plurality of environmental equipment systems.

42. The regulatory compliance method of claim 35, wherein said digital data further comprises maintenance scheduling for said plurality of environmental equipment systems.

43. The regulatory compliance method of claim 35, further comprising:
electronically determining a time of said physical presence of said service personnel at said plurality of environmental equipment systems.

44. The regulatory compliance method of claim 35, further comprising:
generating noncompliance notices indicating failure to renew service contracts.

45. A method for determining regulatory compliance of a multitude of separately owned environmental equipment systems with respect to timely servicing of said multitude of separately owned environmental equipment systems, said multitude of separately owned environmental equipment systems being serviced by service personnel, said method comprising:
electronically detecting abnormal operation of environmental equipment at each of said multitude of separately owned environmental equipment systems utilizing at least one equipment malfunction sensor mounted at said multitude of separately owned environmental equipment systems;
detecting a physical presence of said service personnel at each of said multitude of separately owned environmental equipment systems utilizing at least one service personnel presence sensor;
electronically utilizing at least one clock to determine at least a date for said detected abnormal equipment operation and at least a date for said physical presence of said service personnel at each of said multitude of separately owned environmental equipment systems;
electronically collecting dates of detected abnormal operation and said physical presence of said service personnel at said multitude of separately owned environmental equipment systems; and
electronically generating accumulated reports relating to said operational data, said personnel data, and said clock data.

46. The compliance method of claim 45, further comprising:
electronically storing scheduled inspection requirements requiring said physical presence of service personnel for each of said multitude of separately owned environmental equipment systems.

47. The compliance method of claim 45, further comprising
administrating at least said step of electronically collecting dates of detected abnormal operation and said physical presence of said service personnel at said multitude of separately owned environmental equipment systems by an independent entity as a third party.

48. The compliance method of claim 45, further comprising:
generating a website and accessing said website by a regulatory body.

49. The compliance method of claim 45, further comprising:
generating reports of noncompliance with scheduled inspections and timely repairs.

50. The compliance method of claim 46, further comprising:
generating notices of noncompliance with said scheduled inspection requirements.

51. The regulatory compliance method of claim 45, further comprising:
generating a record of when said multitude of environmental equipment systems starts initial operation for the first time.

52. The regulatory compliance method of claim 51, further comprising:
detecting an initial physical presence of said service personnel for said initial operation.

53. The compliance method of claim 45, further comprising:
generating noncompliance notices indicating failure to renew service contracts.

54. A method for determining regulatory compliance of a plurality of environmental equipment systems for monitoring said plurality of environmental equipment systems with respect to timely servicing of said plurality of environmental equipment systems by a plurality of service companies, a regulatory body for monitoring said plurality of environmental equipment systems and an independent third party entity, said method comprising:
installing environmental equipment for each of said plurality of environmental equipment systems;
installing a first electronic sensor for detecting abnormal operation of said environmental equipment;
electronically detecting said abnormal operation of said environmental equipment;
said third party storing dates of said detected abnormal operation of said environmental equipment;
providing a second electronic sensor for detecting a presence of service personnel at each of said plurality of environmental equipment systems;
electronically detecting said presence of said service personnel at said environmental equipment systems;
said third party entity storing dates of said detected presence of said service personnel at each of said plurality of environmental equipment systems; and
generating reports utilizing said dates of said detected presence stored by said third party entity.

55. The regulatory compliance method of claim 54, further comprising:
producing a website and accessing said website to obtain said dates of said detected presence and said dates of said abnormal operation by said regulatory body.

56. The compliance method of claim 55, further comprising:
access to said website for said plurality of service companies.

57. The compliance method of claim 54, further comprising:
providing an electronic connection to a regulatory body such that said regulatory body selectively generates reports on said plurality of environmental equipment systems.

58. The compliance method of claim 54, further comprising:
generating reports of noncompliance with a schedule of required maintenance for said plurality of environmental equipment systems.

59. The compliance method of claim 55, further comprising:
generating noncompliance notices indicating failure to renew service contracts for maintenance of said plurality of environmental equipment systems.

60. A compliance system for a plurality of environmental equipment systems operable for monitoring said plurality of environmental equipment systems at a plurality of different sites and with respect to timely servicing of said plurality of environmental equipment systems by service personnel, there being at least one regulatory body for monitoring said plurality of environmental equipment systems with respect to timely servicing of said plurality of environmental equipment systems, said system comprising:
environmental equipment installed at each of said plurality of environmental equipment systems;
a first electronic sensor for detecting abnormal operation of said environmental equipment installed at each of said plurality of environmental equipment systems;
a second electronic sensor adapted to verify a physical presence of service personnel at each of said plurality of environmental equipment systems; and
at least one processor configured for collecting and storing data comprising dates of said detected abnormal operation and dates of said physical presence of said service personnel at each of said plurality of environmental equipment systems, said at least one processor comprising at least one storage element, said at least one processor being further configured for communicating said data from said at least one data storage element to at least one computer of said regulatory body for determining whether said plurality of environmental equipment systems are timely serviced.

61. The compliance system of claim 60, further comprising at least one data storage member configured to store said data, said data further comprising schedules for required maintenance of said plurality of environmental equipment systems.

62. The compliance system of claim 61, further comprising:
an independent entity for administering said at least one data storage member.

63. The compliance system of claim 60, wherein said data comprises names of a plurality of different owners for said plurality of environmental equipment systems.

64. The compliance system of claim 63, wherein said data comprises address information for contacting responsible parties for said plurality of environmental equipment systems.

65. The compliance system of claim 60, further comprising at least one network server programmed for generating a website and for posting onto said website said data comprising dates of said detected abnormal operation and dates of said physical presence of said service personnel at each of said plurality of environmental equipment systems, said at least one network server being configured for responding to inquiries from to said at least one computer of said regulatory body.

66. The compliance system of claim 65, wherein said website comprises selectable options for generating noncompliance reports that show noncompliance with scheduled inspection requirements and timely repair requirements for said plurality of environmental equipment systems.

67. The compliance system of claim 60, further comprising:
means for generating a record of when each of said plurality of environmental equipment systems is placed in operation for the first time or after being shut down for repairs.

68. A method for determining regulatory compliance of a plurality of environmental equipment systems, said plurality of environmental equipment systems being serviced by at least one service company having service personnel, there being a third party entity and a regulatory body for monitoring said plurality of environmental equipment systems with respect to timely servicing of said plurality of environmental equipment systems, said method comprising:
installing environmental equipment for each of said plurality of environmental equipment systems;
installing a first electronic sensor for detecting abnormal operation of said environmental equipment;
installing a second electronic sensor adapted to detect a physical presence of said service personnel at each of said plurality of environmental equipment systems;
electronically detecting said abnormal operation of said environmental equipment;
upon detection of said abnormal operation or said physical presence, electronically transmitting corresponding data;
electronically receiving said data by at least one computer of said third party entity;
electronically storing said data; and
electronically reporting from said third party to said regulatory body about timely servicing of said plurality of environmental equipment systems.

69. The regulatory compliance method of claim 68, further comprising:
connecting at least one computer of said regulatory body to said at least one computer of said third party.

70. The regulatory compliance method of claim 68, further comprising:
generating reports of noncompliance for said plurality of environmental equipment systems, and sending said reports to said at least one service company and to parties responsible for said plurality of environmental equipment systems.

71. The regulatory compliance method of claim 68, further comprising:
generating reports concerning compliance with scheduled inspections and timely repairs for said plurality of environmental equipment systems.

72. The regulatory compliance method of claim 68, further comprising:

electronically storing a date of said physical presence of said service personnel at said plurality of environmental equipment systems.

73. The regulatory compliance method of claim 68, further comprising storing names of parties responsible for said plurality of environmental equipment.

* * * * *

UNITED STATES PATENT AND TRADEMARK OFFICE
CERTIFICATE OF CORRECTION

| | | |
|---|---|---|
| PATENT NO. | : 7,149,701 B2 | |
| APPLICATION NO. | : 10/003633 | |
| DATED | : December 12, 2006 | |
| INVENTOR(S) | : Jerry L. McKinney | |

It is certified that error appears in the above-identified patent and that said Letters Patent is hereby corrected as shown below:

At column 25, line 8, add --providing-- before the word "access".

Signed and Sealed this

Twentieth Day of March, 2007

JON W. DUDAS
*Director of the United States Patent and Trademark Office*